United States Patent
Zhu et al.

(10) Patent No.: US 7,206,331 B2
(45) Date of Patent: Apr. 17, 2007

(54) TRANSMISSION METHOD FOR PAGING INDICATION CHANNELS IN CODE DIVISION MULTIPLE ACCESS MOBILE COMMUNICATION SYSTEM

(75) Inventors: Jingning Zhu, Shen Zhen (CN); Huajia Li, Shen Zhen (CN)

(73) Assignee: Huawei Technologies Co. Ltd., Shen Zen (CN)

( * ) Notice: Subject to any disclaimer, the term of this patent is extended or adjusted under 35 U.S.C. 154(b) by 669 days.

(21) Appl. No.: 10/435,989

(22) Filed: May 12, 2003

(65) Prior Publication Data

US 2004/0018840 A1 Jan. 29, 2004

Related U.S. Application Data

(63) Continuation of application No. PCT/CN02/00097, filed on Feb. 20, 2002.

(30) Foreign Application Priority Data

Jul. 18, 2001 (CN) ............... 01 1 26233

(51) Int. Cl.
*H04B 1/69* (2006.01)
(52) U.S. Cl. .................................... 375/130
(58) Field of Classification Search ............... 375/130, 375/146, 228, 213; 455/426.1, 458, 567, 455/426

See application file for complete search history.

(56) References Cited

U.S. PATENT DOCUMENTS 6,697,622 B1 * 2/2004 Ishikawa et al. ............ 455/434

2002/0093920 A1 * 7/2002 Neufeld et al. ............ 370/311

FOREIGN PATENT DOCUMENTS

| WO | WO 98/54919 | 12/1998 |
| WO | WO 00/10366 | 2/2000 |
| WO | WO 00/56103 | 9/2000 |

OTHER PUBLICATIONS

"3GPP TS 25.211. V3.7.0 (Jun. 2001) 3rd Generation Partnership Project; Technical Specification Group Radio Access Network; Physical Channels and Mapping of Transport Channels onto Physical Channels (FDD)" (Release 1999).

(Continued)

*Primary Examiner*—Khai Tran
(74) *Attorney, Agent, or Firm*—Dorsey & Whitney LLP

(57) ABSTRACT

Transmission methods for a paging indication channel in code division multiple access (CDMA) mobile communication system are provided, wherein signals are transmitted when paging indication bits indicate that user equipment has paging information, and when the user equipment has no paging information, the corresponding paging indication bits are set to 0, and the transmission of the signals are closed off. For example, it assumes that the number of the user equipment supported by a paging indication channel is 144, and the total bits are 288. If only one user equipment is paged at this time, it is required to transmit only two bits, and the signals of the other 286 bits will not be transmitted. Therefore, comparing to prior transmission methods for a paging indication channel, the methods in the present invention significantly reduce transmission power and interference and increase the capacity of the entire system.

3 Claims, 3 Drawing Sheets

OTHER PUBLICATIONS

"Universal Mobile Telecommunications System (UMTS); UTRAN Iub Interface User Plane Protocols for Common Transport Channel Data Streams (3GPP TS 25.435 version 3.5.0 Release 1999)" ETSI TS 125 435 V3.5.0, XX, XX, Dec. 2000, XP002182461 Paragraphs 5,1.3, 6.2.4, 6.2.7.11 and 6.2.7.12.

"Universal Mobile Telecommunications System (UMTS); Multiplexing and Channel Coding (TDD) (3GPP TS 25.222 version 3.6.0 Release 1999)" ETSI TS 125 222 V3.6.0, XX, XX, Mar. 2001, pp. 8-38, XP002213943 paragraph 4.3.2.

Ericsson: "TSGR1#6(99)848—Updated text proposal for Paging Structure" TSG-RAN Working Group 1 Meeting #6, 'online! Sep. 7, 1999, pp. 1-3, XP002277020 Espoo Finland; Jul. 13-16, 1999 Retrieved from the Internet: <URL:www.3gpp.org/ftp/tsg-ran/WG1_RL1/TSGR_06/Docs/Pdfs/r1-99848.pdf> 'retrieved on Apr. 15, 2004!.

* cited by examiner

US 7,206,331 B2

TRANSMISSION METHOD FOR PAGING INDICATION CHANNELS IN CODE DIVISION MULTIPLE ACCESS MOBILE COMMUNICATION SYSTEM

CROSS-REFERENCE TO RELATED APPLICATION

This utility patent application is a continuation application and claims priority of the PCT International Patent Application, serial number PCT/CN02/00097, filed on Feb. 20, 2002, which claims the priority of the Chinese patent application, serial number CN 01126233.8, filed on Jul. 18, 2001; subject matter of which are incorporated herewith by reference.

FIELD OF THE INVENTION

The invention relates to mobile communication systems, and more particularly, the invention relates to a transmission method for paging indication channels in code division multiple access mobile communication systems.

BACKGROUND OF THE INVENTION

Since the end of the 1980s, the code division multiple access (CDMA) technology has been used in the field of the digital mobile communication. Because of the efficiency in frequency use and capability of rejecting interference, CDMA technology has become an excellent choice of a mobile communication system. With the development of the mobile communication technology and the increasing demand of communication, the research and development has focused on the third generation of a mobile communication system. It is a common knowledge that the CDMA technology is used in the third generation of the mobile communication system. Currently, three mechanisms have been accepted as a selection pool for an air interface of the International Mobile Telecommunications for the year 2000 (IMT-2000). They are: wide-band CDMA (WCDMA), CDMA2000 and TD-SCDMA, respectively.

In a WCDMA cellular system, channel address codes interact with each other. The effects are two folds: the first one is that any one of the channels will be interfered by the other channels with different address codes, that is the interference caused by multiple access; and the second one is that the reception of the channels with a distance near a receiver is interfered more seriously than the reception of the channels with a distance far from the receiver, thereby causing the strong signals at the near-end to cover the weak signals at the far-end, i.e. the near-far effect. A WCDMA system is a self-interfering system, and any accumulation of various kinds of interference reduces the capacity and quality of the system. A plurality of key technologies, including power control, diversity transmission, and the like, are employed in a WCDMA digital mobile communication system to implement the advantages of high capacity and high quality. Reducing the transmission power and interference has become the key features of WCDMA technology.

Paging function is one of the basic functions in a communication system.

When user equipment is in a cell dedicated channel state for a connection mode (i.e. a CELL_DCH state) or in a cell forward access channel state (i.e. a CELL_FACH state) in a WCDMA system, PAGING TYPE 2 is transmitted downwardly by a base station via a dedicated control channel.

When the user equipment is in an idle mode, in a connection mode of a cell paging channel state (i.e. a CELL_PCH state), or in a user registering area paging channel state (i.e. a URA_PCH state), it is required to use a paging control channel (PCCH) to implement the paging function. Paging information of PAGING TYPE 1 is transmitted downwardly, and the paging channel (PCH) is mapped into a transmission channel. It is borne by a subsidiary common control physical channel (S-CCPCH) in a physical layer, and the user equipment is informed of whether a paging is present or not by a paging indication channel (PICH) of the physical layer.

The paging indication channel (PICH) and the S-CCPCH for bearing PCH information are associated with each other and have a relationship according to the time sequence, as shown in FIG. 1. If a paging indicator $P_q$ in the paging indication channel (PICH) frame is set to 1, then it is indicated that the paging messages will be borne by the frame of the subsequent subsidiary common control physical channel (S-CCPCH), and that the frame of the subsidiary common control physical channel (S-CCPCH) will begin to transmit at the time $\tau_{PICH}$ after the PICH frame, wherein $\tau_{PICH}$ is defined as 7680 divisions. After the paging indication of the user equipment is retrieved by itself from the indicator of the PICH channel, the contents of the paging information is retrieved on the corresponding S-CCPCH channel. Each of the user equipment corresponds to one indicator on the PICH channel. Therefore, how many indicators in one PICH frame that will be set to 1 depends on how many paging messages of the user equipment is transmitted downwardly by the subsequent S-CCPCH channel at a time.

A plurality of complete −1 bits are used in the present transmission scheme of the paging indication channel (PICH) to indicate that the indicator is set to 1, that is, there is paging information corresponding to the user equipment; and a plurality of complete +1 bits indicate that the indicator is 0, that is, there is no paging information for the user equipment. It is assumed that a certain user equipment corresponds to the paging indicator $P_q$, the suffix q indicates the location of the paging indication corresponding to the user equipment, and both the base station and the user equipment obtain q by calculating based on the existing equation, for example, the one currently existed in the protocol of WCDMA system:

$$q=\{PI+[((18*(SFN+[SFN/8]+[SFN/64]+[SFN/512]))\bmod 144)*Np/144])\bmod Np$$

wherein, the parameter PI is obtained by the calculation by the high layer of the user equipment, SFN is the frame number of the system corresponding to the primary common control physical channel (P-CCPCH) at the time PICH beginning to transmit.

FIG. 2 illustrates the PICH frame structure. Each PICH frame has $N_p$ paging indicator mapping into information of 288 bits, wherein, $N_p$=18, 36, 72, 144. The transmission of the last 12 bits of the frame is closed off to reserve for expanding the other channels. The corresponding relationship between the respective paging indicators of the PICH frame and the PICH bits (bits of the PICH frame) is shown in Table 1 as follows.

TABLE 1

| Number of paging indication of each frame ($N_p$) | $P_q = 1$ | $P_q = 0$ |
|---|---|---|
| $N_p = 18$ | $\{b_{16q}, \ldots b_{16q+15}\} = \{-1, -1, \ldots -1\}$ | $\{b_{16q}, \ldots b_{16q+15}\} = \{+1, +1, \ldots +1\}$ |
| $N_p = 36$ | $\{b_{8q}, \ldots b_{8q+7}\} = \{-1, -1, \ldots -1\}$ | $\{b_{8q}, \ldots b_{8q+7}\} = \{+1, +1, \ldots +1\}$ |
| $N_p = 72$ | $\{b_{4q}, \ldots b_{4q+3}\} = \{-1, -1, \ldots -1\}$ | $\{b_{4q}, \ldots b_{4q+3}\} = \{+1, +1, \ldots +1\}$ |
| $N_p = 144$ | $\{b_{2q}, b_{2q+1}\} = \{-1, -1\}$ | $\{b_{2q}, b_{2q+1}\} = \{+1, +1\}$ |

In such PICH channel transmission method, the signals are transmitted regardless of whether the paging information exists or not. +1 or −1 is decided by the user equipment from the phase of the bits of the received PICH frame, thereby deciding whether the paging information exists or not.

In the current WCDMA system, up to 8 user equipment can be paged simultaneously in one paging information. However, the paging capability of the paging indication channel PICH is much larger. Only up to 8 bits in $N_p$ paging indicators is set to 1, that is, a large part of the power used for transmitting the information is $P_q=0$, i.e. no paging. In this situation, not only the transmission power is wasted, but also the other users are interfered, and the system capacity is affected.

SUMMARY OF THE INVENTION

In order to solve the above problems, such as when no paging information exists, signals are still transmitted, thereby wasting the transmission power and interfering the other users, the present invention provides a paging indication channel transmission system and method to decrease the transmission power, to reduce the interference, and to increase the system capacity.

According to the present invention, a transmission method for a paging indication channel in a WCDMA mobile communication system comprising a user equipment and a base station system is provided, said method comprises the steps of: determining whether the user equipment has paging information; setting a corresponding paging indicator to 0 when the user equipment has no paging information; characterized in that paging signals are transmitted only when a paging indicator indicates that the user equipment has paging information, wherein the transmission of the signals is closed off when user equipment has no paging information and when the paging indicator is set to 0, said step further comprising, a) resolving a paging indication location q corresponding to the user equipment by the base station and the user equipment based on a predetermined rule after a number of the paging indicators $N_p$ are determined; b) determining values of the respective paging indicators $P_q$ by the base station based on paging indication information, whereby the values of P0, . . . , PNp−1 are determined; c) transforming the paging indicators $P_q$ into corresponding bits, whereby bits corresponding to frame paging indicators of the paging indication channel are set to total M bits, setting an integer k=M/Np, and each paging indicator is indicated by transformed k bits, the each paging indicator $P_q=1$ is transformed into +1 or −1, and the each paging indicator $P_q=0$ is transformed into 0; d) frequency-spreading, modulating and transmitting a bit corresponding to the paging indicator Pq by the base station.

Preferably, the paging indicator $P_q$ is a Boolean quantity, the paging indicator $P_q=1$ indicates that the corresponding user equipment has paging information, and the paging indicator $P_q=0$ indicates that the corresponding user equipment has no paging information.

After frequency-spreading the bits corresponding to the paging indication bit $P_q=0$, signals are modulated by using 0 signals, i.e., the transmission of the paging indication bits is closed off. When the bits corresponding to the paging indication bit $P_q=1$, the signals are transmitted.

DETAILED DESCRIPTION OF THE PREFERRED EMBODIMENTS

A paging indication channel transmission method of a wideband code division multiple access (WCDMA) communication system in accordance with the principles of the present invention is based on user equipment and a base station system. When indicators indicate that the user equipment has paging information, signals are transmitted. When the user equipment has no paging information, the corresponding paging indicators are set to 0, and paging indication transmission will be closed off for transmitting the signals.

Figure 1:
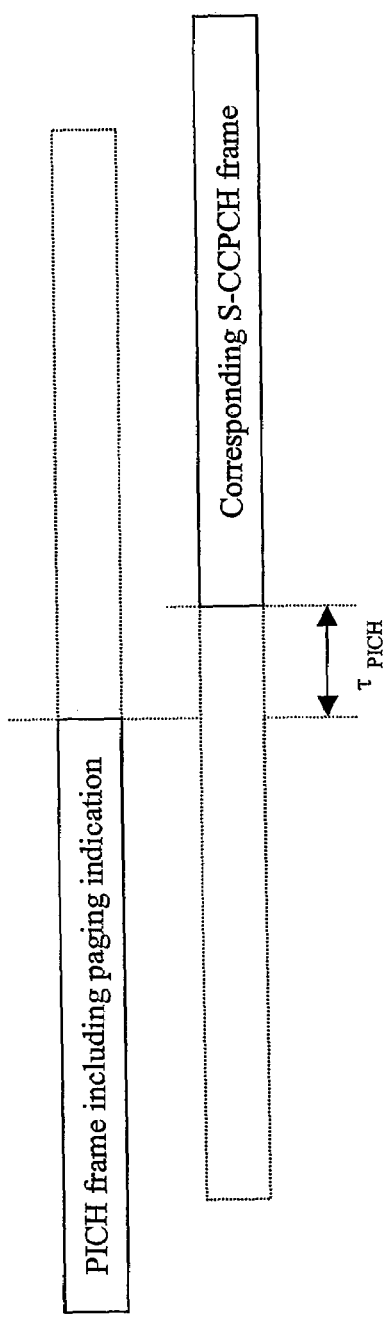
FIG. 1 is a schematic diagram of a time sequence relationship between a frame of a paging indication channel and a frame of a subsidiary common control physical channel.
Figure 2:
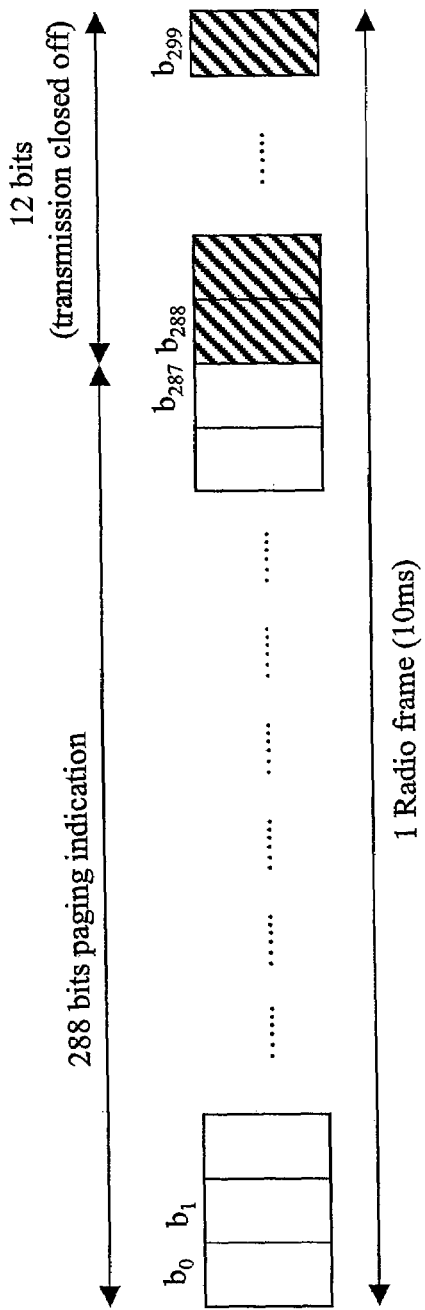
FIG. 2 is a schematic diagram of one embodiment of a paging indication channel structure in accordance with the principles of the present invention.
Figure 3:
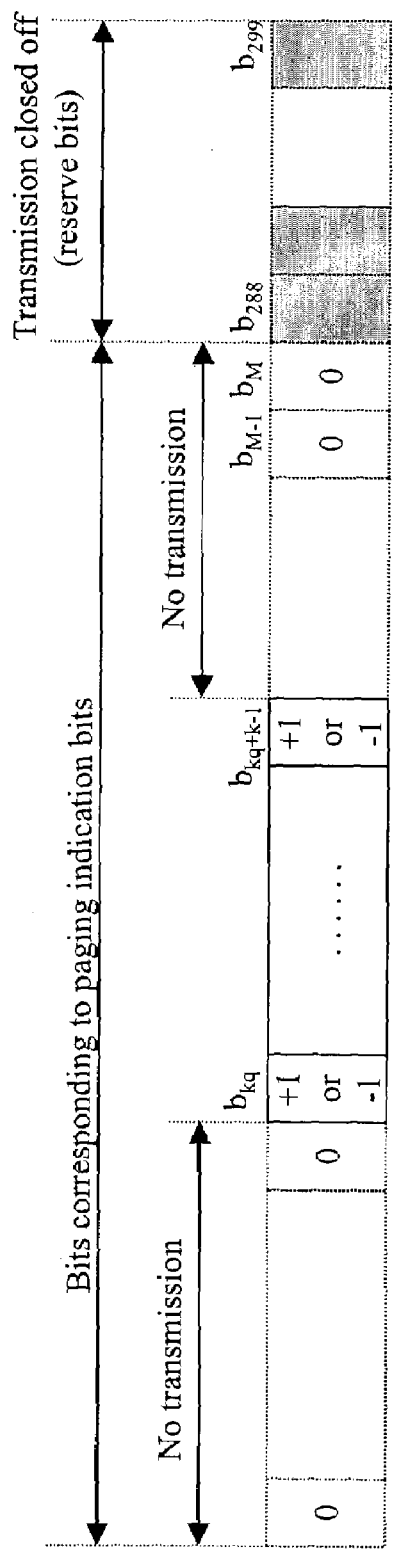
FIG. 3 is a transmission illustration diagram of closing off a paging indication transmission when there is no paging information in accordance with the principles of the present invention.

In FIG. 3, the paging indication channel transmission method comprises the steps of:

a) resolving a paging indication location q corresponding to the respective user equipment by a base station and the user equipment based on a predetermined rule (e.g. the above equation stipulated in the protocol), after the number of paging indicators $N_p$ is determined in a high layer;

b) determining values of the respective paging indicators $P_q$ by the base station based on paging indication information, that is, determining the values of $\{P_0, \ldots, P_{Np-1}\}$. $P_q=1$ indicates that the user equipment has paging information, and $P_q=0$ indicates that the user equipment has no paging information.

c) transforming the paging indicators $P_q$ into corresponding bits, bits corresponding to frame paging indicators of a paging indication channel are set to total M bits, setting integer k=integer [M/$N_p$], and each paging indicator is indicated by the transformed k bits, each paging indicator $P_q=1$ is transformed into k amount of +1s (See Table 2)

or −1s (See Table 3), and each paging indicator $P_q=0$ is transformed into k amount of 0s; and d) frequency-spreading, modulating and transmitting bits corresponding to the paging indicator $P_q$ by the base station.

The paging indicator $P_q$ is a Boolean quantity, the paging indicator $P_q=1$ indicates that the corresponding user equipment has paging information, and the paging indicator $P_q=0$ indicates that the corresponding user equipment has no paging information.

After frequency-spreading the bits corresponding to the paging indicator $P_q=0$, signals are modulated by using 0 signals, i.e., the transmission of the paging indicators is closed off. When the bits corresponding to the paging indicator $P_q=1$, the signals are transmitted.

When the paging indicator $P_q$ is transformed into the corresponding bits, it is assumed that the bits corresponding to PICH frame paging indicators have total M bits; and there are two transformation methods as shown in Table 2 or Table 3, one of them will be selected based on a predetermined rule of the communication system.

A PICH frame structure is shown in FIG. 3. The preceding M bits of the frame are the bits corresponding to the paging indicators, and the other residual bits are used for closing off the transmission and reserving for spreading the other channels. In the preceding M bits, $b_{kp}$ to $b_{kp+k-1}$ equal to +1 or −1, and the other bits are 0s.

TABLE 2

| Number of paging indicators of each frame ($N_p$) | $P_q = 1$ | $P_q = 0$ |
|---|---|---|
| $N_p$ | $\{b_{kq}, \ldots b_{kq+k-1}\} = \{+1, +1, \ldots +1\}$ | $\{b_{kq}, \ldots b_{kq+k-1}\} = \{0, 0, \ldots 0\}$ |

TABLE 3

| Number of paging indicators of each frame ($N_p$) | $P_q = 1$ | $P_q = 0$ |
|---|---|---|
| $N_p$ | $\{b_{kq}, \ldots b_{kq+k-1}\} = \{-1, -1, \ldots -1\}$ | $\{b_{kq}, \ldots b_{kq+k-1}\} = \{0, 0, \ldots 0\}$ |

Figure 4:
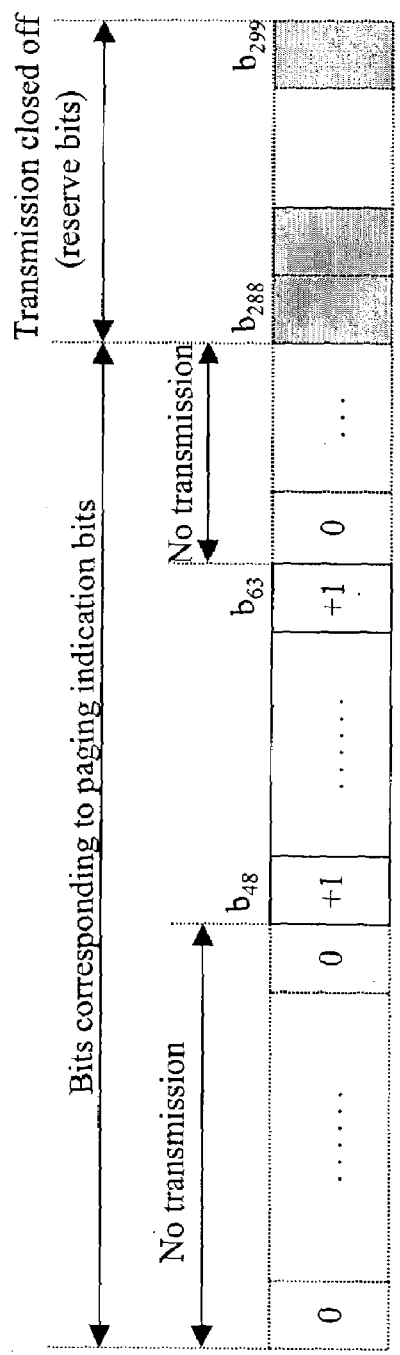
FIG. 4 is a transmission illustration diagram of a first embodiment of closing off the paging indication transmission when there is no paging information in accordance with the principles of the present invention

Based on the method described above, two embodiments will be described as follows:

In the first embodiment of a CDMA mobile communication system, the structure of one PICH frame is shown in FIG. 4. The paging indicators correspond to the preceding 288 bits, the transmission is closed off from $b_{288}$ to $b_{299}$ to reserve for spreading the other channels. The number of the paging indication of the paging indication channel is set as $N_p$, selected as 18, and each paging indicator corresponds to 16 bits. One paging information only pages one user equipment, the high layer calculates the corresponding paging indication number q=3 based on the equation stipulated by the above protocol. Then the corresponding indication bits in the frame of the paging indication channel are $p_0=0$, $p_1=0$, $p_2=0$, $p_3=1$, $P_4=P5=\ldots=P_{17}=0$, respectively. Based on the provision of Table 4, the bits $b_{48}$ to $b_{63}$ in the frame of the paging indication channel are +1s, and the signals are transmitted after spreading and modulating. All of the other bits are 0s, and they are modulated by 0 after spreading, thus, the signals are not transmitted for the paging indicators of $P_q=0$.

In this way, 272 bits among 288 bits do not transmit signals.

TABLE 4

| Number of paging indicators of each frame ($N_p$) | $P_q = 1$ | $P_q = 0$ |
|---|---|---|
| $N_p = 18$ | $\{b_{16q}, \ldots b_{16q+15}\} = \{+1, +1, \ldots +1\}$ | $\{b_{16q}, \ldots b_{16q+15}\} = \{0, 0, \ldots 0\}$ |

Figure 5:
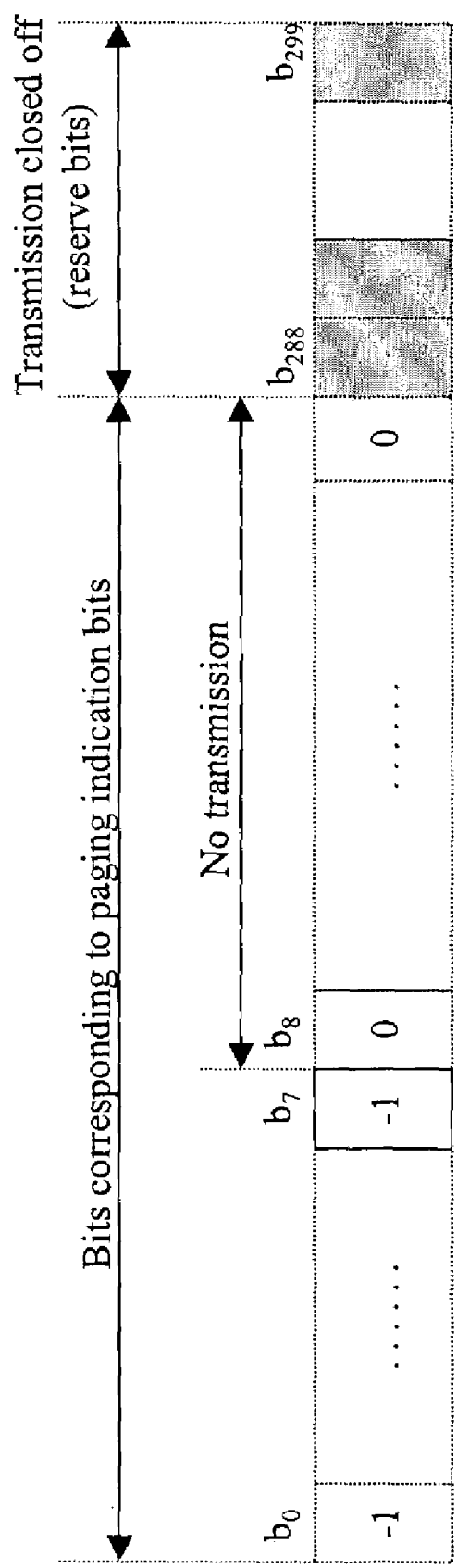
FIG. 5 is a transmission illustration diagram of a second embodiment of closing off the paging indication transmission when there is no paging information in accordance with the principles of the present invention.

FIG. 5 illustrates a second embodiment of the structure of a PICH frame. The paging indicators correspond to the preceding 288 bits, and the transmission is closed off from $b_{288}$ to $b_{299}$ to reserve for spreading the other channels.

The number of paging indication of a paging indication channel is $N_p$ which is selected as 36, and each paging indicator corresponds to 8 bits. One paging information only pages one user equipment, and the high layer calculates the corresponding paging indication number q=0 based on the equation. Then the corresponding indicators in the PICH frame are $p_0=1$, $p_1=p_2=p_{35}=0$, respectively. Based on the provision of the Table 5, among the preceding 288 PICH bits, bits $b_0 \sim b_7$ are −1s, and the signals are transmitted after spreading and modulating. All of the other bits are 0s, and they are modulated by 0 after spreading, thus, the signals are not transmitted for the paging indicators of $P_q=0$.

In this way, 280 bits among 288 bits do not transmit signals.

TABLE 5

| Number of paging indicators of each frame ($N_p$) | $P_q = 1$ | $P_q = 0$ |
|---|---|---|
| $N_p = 36$ | $\{b_{8q}, \ldots b_{8q+7}\} = \{-1, -1, \ldots -1\}$ | $\{b_{8q}, \ldots b_{8q+7}\} = \{0, 0, \ldots 0\}$ |

INDUSTRY APPLICABILITY

Because the above transmission methods for a paging indication channel are employed in the present invention, signals are transmitted only when the indicators indicate that user equipment has paging information. The corresponding paging indicators are set to 0 when the user equipment has no paging information, and the transmitting of the signals is closed off. For example, it is assumed that the number of the user equipment supported by a paging indication channel is 144, and the total bits are 288. If only one user equipment is paged at this time, it is required to transmit only two bits, and the signals of the other 286 bits will not be transmitted. Therefore, comparing to prior transmission methods for a paging indication channel, the methods in the present invention significantly reduce transmission power and interference and increase the capacity of the entire system.

What is claimed is:

1. A transmission method for a paging indication channel in a WCDMA mobile communication system comprising a user equipment and a base station system, the method comprising the steps of:

determining whether the user equipment has paging information;

setting a corresponding paging indicator to 0 when the user equipment has no paging information; and transmitting paging signals only when a paging indicator indicates that the user equipment has paging information, wherein transmission of the paging signals is closed off when the user equipment has no paging information and when the paging indicator is set to 0, the method comprises the steps of:

a) resolving a paging indication location q corresponding to the user equipment by the base station and the user equipment based on a predetermined rule after a number of the paging indicators Np are determined;

b) determining values of respective paging indicators $P_q$ by the base station based on paging indication information, whereby the values of $P_0, \ldots, P_{Np-1}$, are determined;

c) transforming the paging indicators $P_q$ into corresponding bits, whereby bits corresponding to frame paging indicators of the paging indication channel are set to total M bits, setting an integer $k=M/N_p$, and each paging indicator is indicated by transformed k bits, the each paging indicator $P_q=1$ is transformed into +1 or −1, and the each paging indicator $P_q=0$ is transformed into 0; and d) frequency-spreading, modulating and transmitting a bit corresponding to the paging indicator $P_q$ by the base station.

2. The method of claim 1, wherein the paging indicator $P_q$ is a Boolean quantity, the paging indicator $P_q=1$ indicates that the corresponding user equipment has paging information, and the paging indicator $P_q=0$ indicates that the corresponding user equipment has no paging information.

3. The method of claim 1, wherein after spreading the bits corresponding to the paging indication bit $P_q=0$, the bits are modulated by using 0 signals, and the signals are transmitted when the bits correspond to the paging indication bit $P_q=1$.

* * * * *